(12) United States Patent
Aoki et al.

(10) Patent No.: US 10,163,581 B2
(45) Date of Patent: *Dec. 25, 2018

(54) LAMINATED POWER STORAGE DEVICE

(71) Applicant: Murata Manufacturing Co., Ltd., Nagaokakyo-shi, Kyoto-fu (JP)

(72) Inventors: Norihisa Aoki, Nagaokakyo (JP); Yasutake Fukuda, Nagaokakyo (JP); Hiroshi Kunimatsu, Nagaokakyo (JP); Yasuhiko Ueda, Nagaokakyo (JP); Kenji Kimura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,402

(22) Filed: Sep. 22, 2017

(65) Prior Publication Data

US 2018/0012708 A1 Jan. 11, 2018

Related U.S. Application Data

(63) Continuation of application No. PCT/JP2016/061122, filed on Apr. 5, 2016.

(30) Foreign Application Priority Data

Apr. 16, 2015 (JP) ................. 2015-083952

(51) Int. Cl.
*H01G 11/24* (2013.01)
*H01G 4/30* (2006.01)
(Continued)

(52) U.S. Cl.
CPC ............ *H01G 11/24* (2013.01); *H01G 4/30* (2013.01); *H01G 11/10* (2013.01); *H01G 11/12* (2013.01);
(Continued)

(58) Field of Classification Search
CPC ........ H01G 11/12; H01G 11/24; H01G 11/28; H01G 11/58; H01G 11/70; H01M 4/76
(Continued)

(56) References Cited

U.S. PATENT DOCUMENTS 9,558,893 B2   1/2017   Horikawa et al.
9,748,046 B2   8/2017   Ueda et al.
(Continued)

FOREIGN PATENT DOCUMENTS

JP   H05-21273 A   1/1993
JP   2000-012378 A   1/2000
(Continued)

OTHER PUBLICATIONS

International Search Report issued in International Application No. PCT/JP2016/061122, dated Jun. 21, 2016.
(Continued)

*Primary Examiner* — Yemane Mehari
(74) *Attorney, Agent, or Firm* — Arent Fox LLP (57) ABSTRACT

A laminated power storage device that includes a first end portion of a first current collector extends to an inside of an insulating adhesive portion relative to a first polarizable electrode layer, and a second end portion of a second current collector extends to an inside of the insulating adhesive portion relative to a second polarizable electrode layer.

13 Claims, 4 Drawing Sheets

(51) Int. Cl.

| | | |
|---|---|---|
| *H01G 11/10* | (2013.01) | |
| *H01G 11/72* | (2013.01) | |
| *H01M 10/04* | (2006.01) | |
| *H01G 11/12* | (2013.01) | |
| *H01G 11/28* | (2013.01) | |
| *H01G 11/58* | (2013.01) | |
| *H01G 11/70* | (2013.01) | |
| *H01M 4/76* | (2006.01) | |
| *H01M 2/08* | (2006.01) | |
| *H01M 2/22* | (2006.01) | |
| *H01M 2/26* | (2006.01) | |
| *H01M 2/30* | (2006.01) | |
| *H01G 11/78* | (2013.01) | |
| *H01G 11/80* | (2013.01) | |
| *H01M 4/02* | (2006.01) | |

(52) U.S. Cl.
CPC .......... *H01G 11/28* (2013.01); *H01G 11/58* (2013.01); *H01G 11/70* (2013.01); *H01G 11/72* (2013.01); *H01M 2/08* (2013.01); *H01M 2/22* (2013.01); *H01M 2/266* (2013.01); *H01M 2/30* (2013.01); *H01M 4/76* (2013.01); *H01M 10/04* (2013.01); *H01G 11/78* (2013.01); *H01G 11/80* (2013.01); *H01M 2004/021* (2013.01); *Y02E 60/13* (2013.01)

(58) Field of Classification Search
USPC ..................... 323/355; 324/649; 361/502
See application file for complete search history.

(56) References Cited

U.S. PATENT DOCUMENTS

| | | | |
|---|---|---|---|
| 9,972,821 B2 | 5/2018 | Minagata | |
| 2008/0151472 A1* | 6/2008 | Maletin | H01G 9/016 361/502 |
| 2010/0214721 A1* | 8/2010 | Lee | H01G 9/016 361/502 |
| 2013/0122350 A1 | 5/2013 | Hagiwara et al. | |
| 2014/0062503 A1* | 3/2014 | Behrends | G01N 33/48728 324/649 |
| 2015/0221448 A1 | 8/2015 | Horikawa et al. | |
| 2015/0248970 A1 | 9/2015 | Ueda et al. | |
| 2018/0012704 A1* | 1/2018 | Aoki | H01G 11/72 |
| 2018/0025852 A1* | 1/2018 | Aoki | H01G 11/26 |

FOREIGN PATENT DOCUMENTS

| | | |
|---|---|---|
| JP | 2001-68384 A | 3/2001 |
| JP | 2010-34120 A | 2/2010 |
| WO | WO 2011/118418 A1 | 9/2011 |
| WO | WO 2013/001961 A1 | 1/2013 |
| WO | WO 2014/083919 A1 | 6/2014 |
| WO | WO 2014/083925 A1 | 6/2014 |

OTHER PUBLICATIONS

International Search Report issued in International Application No. PCT/JP2016/061123, dated Jun. 21, 2016.
Written Opinion of the International Searching Authority issued in International Application No. PCT/JP2016/061122, dated Jun. 21, 2016.
Written Opinion of the International Searching Authority issued in International Application No. PCT/JP2016/061123, dated Jun. 21, 2016.

* cited by examiner

LAMINATED POWER STORAGE DEVICE

CROSS REFERENCE TO RELATED APPLICATIONS

The present application is a continuation of International application No. PCT/JP2016/061122, filed Apr. 5, 2016, which claims priority to Japanese Patent Application No. 2015-083952, filed Apr. 16, 2015, the entire contents of each of which are incorporated herein by reference.

FIELD OF THE INVENTION

The present invention relates to a laminated power storage device.

BACKGROUND OF THE INVENTION

A laminated power storage device described in Patent Document 1 includes a first internal electrode extended to a first end surface, a second internal electrode extended to a second end surface, and a separator disposed between the first internal electrode and the second internal electrode. A first external electrode electrically connected to the first internal electrode is disposed on the first end surface. A second external electrode electrically connected to the second internal electrode is disposed on the second end surface. The laminated power storage device described in Patent Document 1 is configured so that in order to increase an area of an interface between the internal electrode and an electrolyte layer and thereby increase the capacity, end surfaces of the internal electrode and the electrolyte layer are flush.

Patent Document 1: International Publication No. 2014/083925

SUMMARY OF THE INVENTION

In the laminated power storage device described in Patent Document 1, there is a demand for suppressing leakage of an electrolyte.

A main object of the present invention is to provide a laminated power storage device in which an electrolyte hardly leaks.

A laminated power storage device according to the present invention includes a device body. The device body has first and second principal surfaces, first and second side surfaces, and first and second end surfaces. The first and second principal surfaces extend along a length direction and a width direction. The first and second side surfaces extend along the length direction and a thickness direction. The device body has a first internal electrode, a second internal electrode, an electrolyte-containing layer, and an insulating adhesive portion. The first internal electrode has a first current collector and a first polarizable electrode layer. The first polarizable electrode layer is provided on at least one of both surfaces of the first current collector. At least the first current collector is extended to the first end surface. The second internal electrode has a second current collector and a second polarizable electrode layer. The second polarizable electrode layer is provided on at least one of both surfaces of the second current collector. At least the second current collector is extended to the second end surface. The electrolyte-containing layer is provided between the first polarizable electrode layer and the second polarizable electrode layer. The insulating adhesive portion adheres to the first current collector and the second current collector, and extends around the first and second polarizable electrode layers and the electrolyte-containing layer. A first end portion of the first current collector extends inside of the insulating adhesive portion relative to the first polarizable electrode layer. A second end portion of the second current collector extends inside of the insulating adhesive portion relative to the second polarizable electrode layer. Thus, adhesion strength between each of the first and second end portions and the insulating adhesive portion can be increased. Thus, leakage of an electrolyte is unlikely to occur. In addition, since the first and second end portions extend to the inside of the insulating adhesive portion, the first and second end portions are protected by the insulating adhesive portion. Thus, occurrence of cracks in the first and second current collectors can be suppressed.

In the laminated power storage device according to the present invention, it is preferable that respective principal surfaces of the first end portion and the second end portion are adhered to the insulating adhesive portion.

In the laminated power storage device according to the present invention, it is preferable that the end portion in the width direction of the first current collector extends to the inside of the insulating adhesive portion relative to the first polarizable electrode layer, and the end portion in the width direction of the second current collector extends to the inside of the insulating adhesive portion relative to the second polarizable electrode layer. In this case, the adhesion strength between each of the first and second current collectors and the insulating adhesive portion can be increased also at both end portions in the width direction of the device body. Thus, leakage of an electrolyte more hardly occurs.

In the laminated power storage device according to the present invention, it is preferable that the first and second end portions each have a curved portion that curves along the length direction. In this case, it is possible to further increase an adhesive area between each of the first and second current collectors and the insulating adhesive portion. Thus, the adhesion strength between each of the first and second end portions and the insulating adhesive portion can be further increased. In addition, a leakage path of an electrolyte becomes long. Accordingly, leakage of the electrolyte can be suppressed more effectively.

In the laminated power storage device according to the present invention, it is preferable that the first and second end portions each have a plurality of the curved portions. In this case, it is possible to further increase an adhesive area between each of the first and second current collectors and the insulating adhesive portion. In addition, the leakage path of an electrolyte becomes longer. Accordingly, leakage of the electrolyte can be suppressed more effectively.

The present invention can provide a laminated power storage device in which an electrolyte hardly leaks.

DETAILED DESCRIPTION OF THE INVENTION

Hereinafter, a description will be given of an example of a preferred embodiment of the present invention. However, the following embodiments are provided merely by way of example. The present invention is not limited to the following embodiments.

Throughout the drawings to which the embodiments and the like refer, elements having substantially the same functions will be referred to by the same reference symbols. The drawings to which the embodiments and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

First Embodiment

Figure 1:
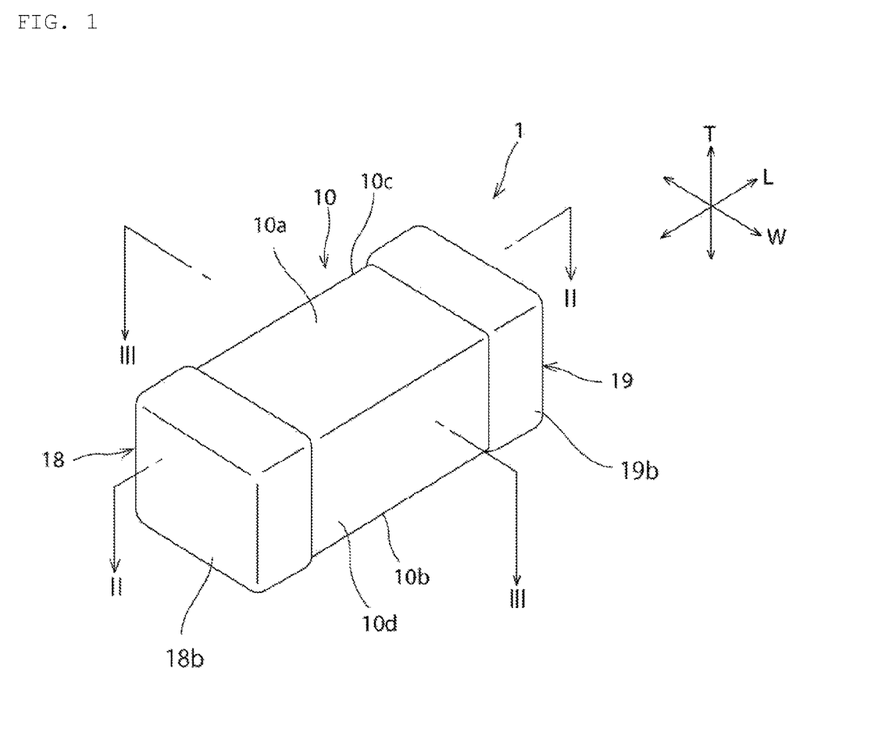
FIG. 1 is a schematic perspective view of a laminated power storage device according to a first embodiment.
Figure 2:
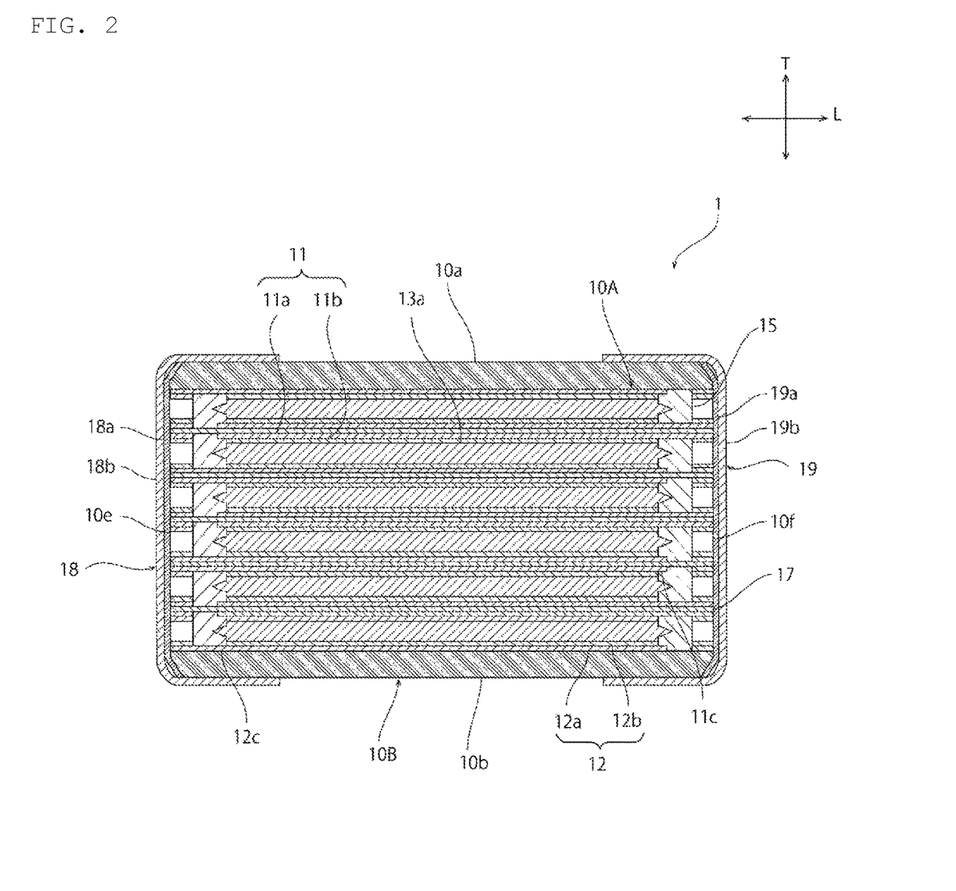
FIG. 2 is a schematic cross-sectional view taken along line II-II of FIG. 1.
Figure 3:
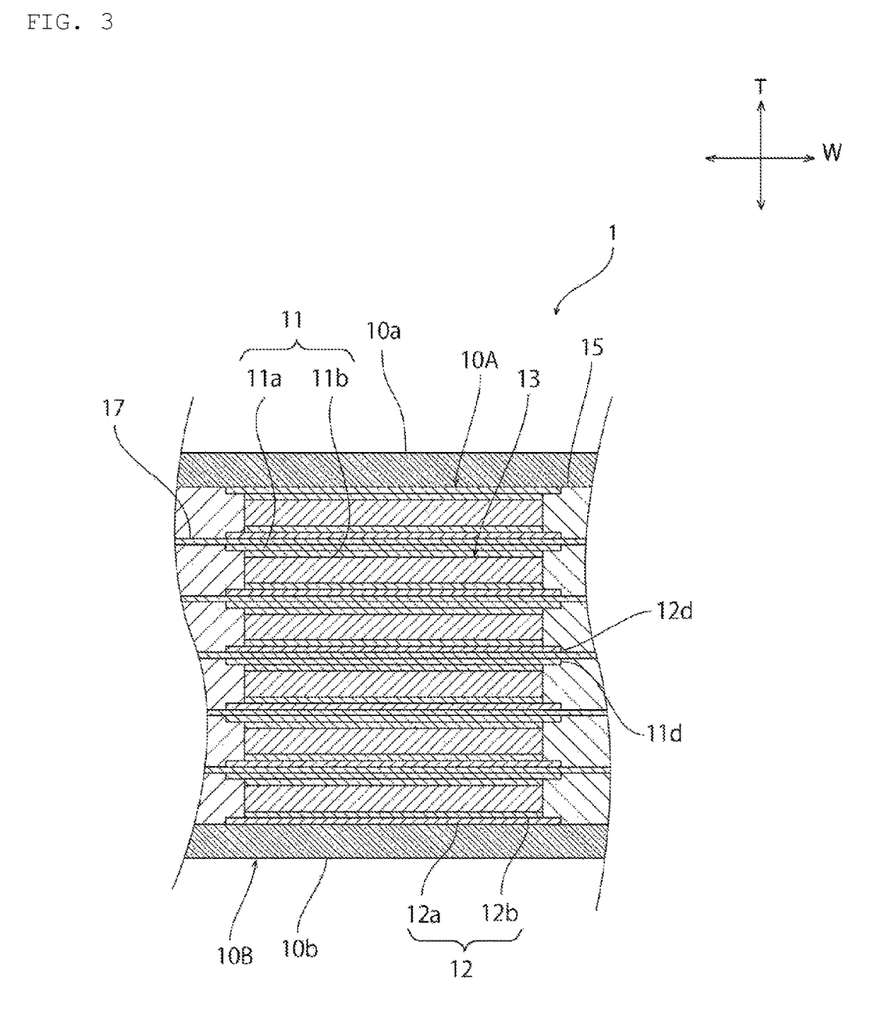
FIG. 3 is a schematic cross-sectional view taken along line III-III of FIG. 1.

FIG. 1 is a schematic perspective view of a laminated power storage device according to this embodiment. FIG. 2 is a schematic cross-sectional view taken along line II-II of FIG. 1. FIG. 3 is a schematic cross-sectional view taken along line III-III of FIG. 1.

A laminated power storage device 1 shown in FIGS. 1 to 3 is, for example, one of an electrical double layer capacitor and a device constituting a secondary battery.

The laminated power storage device 1 includes a device body 10. The device body 10 has first and second principal surfaces 10a and 10b, first and second side surfaces 10c and 10d, and first and second end surfaces 10e and 10f. The first and second principal surfaces 10a and 10b extend along a length direction L and a width direction W, respectively. The first principal surface 10a and the second principal surface 10b face each other in a thickness direction T. The first and second side surfaces 10c and 10d extend along the length direction L and the thickness direction T, respectively. The first side surface 10c and the second side surface 10d face each other in the width direction W. Each of the first and second end surfaces 10e and 10f extends along the width direction W and the thickness direction T. The first end surface 10e and the second end surface 10f face each other in the length direction L. In the present embodiment, the device body 10 is provided in a substantially rectangular parallelepiped shape.

As shown in FIG. 2, the device body 10 has a plurality of first internal electrodes 11 and a plurality of second internal electrodes 12. The first and second internal electrodes 11 and 12 are alternately provided along the thickness direction T.

The first internal electrode 11 is provided in parallel with the first and second principal surfaces 10a and 10b. At least a part of the first internal electrode 11 is extended to the first end surface 10e. The first internal electrode 11 is not extended to the second end surface 10f and the first and second side surfaces 10c and 10d.

The first internal electrode 11 has a first current collector 11a and a first polarizable electrode layer 11b. The first polarizable electrode layer 11b is provided on the surface of at least one side of the first current collector 11a. In the present embodiment, the first polarizable electrode layer 11b is provided on one side of the first current collector 11a.

The first current collector 11a can be constituted by a metal foil formed of at least one metal such as aluminum and copper.

The first polarizable electrode layer 11b preferably contains a carbon material such as activated carbon.

The second internal electrode 12 is provided in parallel with the first and second principal surfaces 10a and 10b. At least a part of the second internal electrode 12 is extended to the second end surface 10f. The second internal electrode 12 is not extended to the first end surface 10e and the first and second side surfaces 10c and 10d.

The second internal electrode 12 has a second current collector 12a and a second polarizable electrode layer 12b. The second polarizable electrode layer 12b is provided on the surface of at least one side of the second current collector 12a. In the present embodiment, the second polarizable electrode layer 12b is provided on one side of the second current collector 12a.

The second current collector 12a can be constituted by a metal foil formed of at least one metal such as aluminum and copper.

The second polarizable electrode layer 12b preferably contains a carbon material such as activated carbon.

An electrolyte-containing layer 13 is provided between the first polarizable electrode layer 11b and the second polarizable electrode layer 12b. The first polarizable electrode layer 11b and the second polarizable electrode layer 12b face each other with the electrolyte-containing layer 13 interposed therebetween.

The electrolyte-containing layer 13 contains an electrolyte. The electrolyte-containing layer 13 is preferably formed of a gel containing an electrolyte. As the gel, for example, high polymer polyethylene oxide resin or the like can be used.

In the present embodiment, the case where the electrolyte-containing layer 13 is formed of the gel containing an electrolyte has been described, but the present invention is not limited thereto. The electrolyte-containing layer 13 may be, for example, one obtained by immersing a porous separator layer in an electrolytic solution.

Specific examples of the electrolytic solution preferably used include ionic liquids such as EMITFSI and EMIBF4, and solvents such as propylene carbonate and acetonitrile.

The first current collector 11a of the first internal electrode 11 and the second current collector 12a of the second internal electrode 12 at least partially face each other with the electrolyte-containing layer 13 interposed therebetween. The first current collector 11a of the first internal electrode 11 and the second current collector 12a of the second internal electrode 12 are adhered to each other by an insulating adhesive portion 15.

The insulating adhesive portion 15 is provided around the first and second polarizable electrode layers 11b and 12b and the electrolyte-containing layer 13. Specifically, the insulating adhesive portion 15 is provided so as to cover a periphery of the first and second polarizable electrode layers 11b and 12b and the electrolyte-containing layer 13.

The insulating adhesive portion 15 is preferably formed of a material which does not allow the electrolyte to permeate. The insulating adhesive portion 15 is preferably formed of, for example, a resin composition containing an acrylic resin and a filler such as silica.

An end portion in the length direction L on the second end surface 10f side of the first current collector 11a constitutes a first end portion 11c. The first end portion 11c extends to the inside of the insulating adhesive portion 15 in the length direction L relative to the first polarizable electrode layer 11b. Specifically, a principal surface of the first end portion 11c is exposed from the first polarizable electrode layer 11b. The principal surface of the first end portion 11c faces the insulating adhesive portion 15. The principal surface of the first end portion 11c and the insulating adhesive portion 15 are adhered.

An end portion in the length direction L on the first end surface 10e side of the second current collector 12a constitutes a second end portion 12c. The second end portion 12c extends to the inside of the insulating adhesive portion 15 in the length direction L relative to the second polarizable electrode layer 12b. Specifically, a principal surface of the second end portion 12c is exposed from the second polarizable electrode layer 12b. The principal surface of the second end portion 12c faces the insulating adhesive portion 15. The principal surface of the second end portion 12c and the insulating adhesive portion 15 are adhered.

The length along the length direction L of the first end portion 11c is greater than the thickness of the first current collector 11a. Specifically, the length along the length direction L of the first end portion 11c is preferably 100 times or more the thickness of the first current collector 11a, more preferably 300 times or more. However, if the length along the length direction L of the first end portion 11c is too long, the area of the current collector that does not contribute to electrical characteristics increases, and thus it is not preferable to set unnecessarily long length. Accordingly, the length along the length direction L of the first end portion 11c is preferably 1000 times or less the thickness of the first current collector 11a, more preferably 700 times or less. The length along the length direction L of the second end portion 12c is greater than the thickness of the second current collector 12a. Specifically, the length along the length direction L of the second end portion 12c is preferably 200 times or more the thickness of the second current collector 12a, more preferably 300 times or more. However, if the length along the length direction L of the second end portion 12c is too long, the area of the current collector that does not contribute to electrical characteristics may increase. Accordingly, the length along the length direction L of the second end portion 12c is preferably 1000 times or less the thickness of the second current collector 12a, more preferably 700 times or less.

As shown in FIG. 3, an end portion 11d in the width direction W of the first current collector 11a extends to the inside of the insulating adhesive portion 15 in the width direction W relative to the first polarizable electrode layer 11b. The end portion 11d is exposed from the first polarizable electrode layer 11b. The end portion 11d faces the insulating adhesive portion 15. A principal surface of the end portion 11d is adhered to the insulating adhesive portion 15.

An end portion 12d in the width direction W of the second current collector 12a extends to the inside of the insulating adhesive portion 15 in the width direction W relative to the second polarizable electrode layer 12b. The end portion 12d is exposed from the second polarizable electrode layer 12b. The end portion 12d faces the insulating adhesive portion 15. A principal surface of the end portion 12d is adhered to the insulating adhesive portion 15.

The first current collector 11a and the second current collector 12a adjacent to each other are adhered by an adhesive layer 17. The adhesive layer 17 reaches both the first and second end surfaces 10e and 10f. The adhesive layer 17 can be formed of urethane or the like, for example.

The first internal electrodes 11 and the second internal electrodes 12 adjacent to each other are adhered by the adhesive layer 17.

The device body 10 has a functional portion 10A and a casing 10B. The functional portion 10A is a portion that exhibits a function as a power storage device. The functional portion 10A includes the first and second internal electrodes 11 and 12 and the electrolyte-containing layer 13 described above.

The casing 10B covers a portion of an outer surface of the functional portion 10A. Specifically, the casing 10B covers first and second principal surfaces and first and second side surfaces of the functional portion 10A. First and second end surfaces of the functional portion 10A are exposed from the casing 10B. Accordingly, the first and second principal surfaces 10a and 10b and the first and second side surfaces 10c and 10d are constituted by the casing 10B. The first and second end surfaces 10e and 10f are constituted by the functional portion 10A and the casing 10B.

A first external electrode 18 is provided on the first end surface 10e. The first external electrode 18 is electrically connected to the first internal electrode 11. The first external electrode 18 has a first electrode film 18a and a first metal cap 18b.

The first electrode film 18a is connected to the first internal electrode 11. The first electrode film 18a is provided so as to cover the first end surface 10e. Specifically, the first electrode film 18a covers substantially the entire first end surface 10e. The first electrode film 18a is not located on the first and second principal surfaces 10a and 10b and the first and second side surfaces 10c and 10d.

The first metal cap 18b covers a portion on the first end surface 10e side of the device body 10. Specifically, the first metal cap 18b covers the first end surface 10e and partially covers the first and second principal surfaces 10a and 10b and the first and second side surfaces 10c and 10d on the first end surface 10e side.

The first metal cap 18b is electrically connected to the first electrode film 18a.

A second external electrode 19 is provided on the second end surface 10f. The second external electrode 19 is electrically connected to the second internal electrode 12. The second external electrode 19 has a second electrode film 19a and a second metal cap 19b.

The second electrode film 19a is connected to the second internal electrode 12. The second electrode film 19a is provided so as to cover the second end surface 10f. Specifically, the second electrode film 19a is provided so as to cover substantially the entire second end surface 10f. The second electrode film 19a is not located on the first and second principal surfaces 10a and 10b and the first and second side surfaces 10c and 10d.

The second metal cap 19b covers a portion on the second end surface 10f side of the device body 10. Specifically, the second metal cap 19b covers the second end surface 10e and partially covers the first and second principal surfaces 10a and 10b and the first and second side surfaces 10c and 10d on the second end surface 10f side.

The second metal cap 19b is electrically connected to the second electrode film 19a.

The first and second electrode films 18a and 19a can be formed of, for example, Al, an Al alloy, or the like.

Each of the first and second metal caps 18b and 19b may be formed of, for example, an Fe—Ni alloy, a Cu—Zn alloy, a Cu—Zn—Ni alloy, Al or the like. A plating film may be provided on outer surfaces of the first and second metal caps 18b and 19b. The plating film may be, for example, an Ni/Ag plating film, an Ni/Au plating film, an Ni/Sn plating film, or the like.

As described above, the laminated power storage device described in Patent Document 1 is configured so that in order to increase the area of the interface between the internal electrode and the electrolyte layer and thereby increase the capacity, the end surfaces of the internal electrode and the electrolyte layer are flush. As a result of intensive research, the present inventors have found that leakage of an electrolyte is liable to occur in the laminated power storage device described in Patent Document 1. The present inventors further have found that the leakage of an electrolyte occurs in the laminated power storage device described in Patent Document 1 due to the fact that a leakage path of the electrolyte is liable to be formed between the end surface of the internal electrode and the insulating adhesive portion, because the end surface of the internal electrode is sometimes not adhered to the insulating adhesive portion, or because the adhesive strength between the end surface of the internal electrode and the insulating adhesive portion is low.

In the laminated power storage device 1, the first end portion 11c which is an end portion on the second end surface 10d side of the first current collector 11a extends to the inside of the insulating adhesive portion 15 relative to the first polarizable electrode layer 11b. The second end portion 12c which is an end portion on the first end surface 10e side of the second current collector 12a extends to the inside of the insulating adhesive portion 15 relative to the second polarizable electrode layer 12b. Thus, the adhesion strength between each of the first and second end portions 11c and 12c and the insulating adhesive portion 15 can be increased. Thus, in the laminated power storage device 1, the leakage of an electrolyte is unlikely to occur. In addition, since the first and second end portions 11c and 12c extend to the inside of the insulating adhesive portion 15, the first and second end portions 11c and 12c are protected by the insulating adhesive portion 15. Thus, occurrence of cracks in the first and second current collectors 11a and 12a can be suppressed.

In the present embodiment, the respective principal surfaces of the first and second end portions 11c and 12c are adhered to the insulating adhesive portion 15. Thus, an adhesive area between each of the first and second current collectors 11a and 12a and the insulating adhesive portion 15 is large. Thus, the adhesion strength between each of the first and second end portions 11c and 12c and the insulating adhesive portion 15 can be further increased. Accordingly, leakage of the electrolyte can be suppressed more effectively.

From the viewpoint of increasing the adhesive area between each of the first and second current collectors 11a and 12a and the insulating adhesive portion 15, as shown in FIG. 3, it is preferable that the end portion in the width direction W of the first current collector 11a extends to the inside of the insulating adhesive portion 15 relative to the first polarizable electrode layer 11b, and the end portion in the width direction W of the second current collector 12a extends to the inside of the insulating adhesive portion 15 relative to the second polarizable electrode layer 12b.

From the same viewpoint, it is preferable that the length along the length direction L of the first end portion 11c is greater than the thickness of the first current collector 11a. It is preferable that the length along the length direction L of the second end portion 12c is greater than the thickness of the second current collector 12a. Specifically, the length along the length direction L of the first end portion 11c is preferably 100 times or more the thickness of the first current collector 11a, more preferably 300 times or more. However, if the length along the length direction L of the first end portion 11c is too long, the area of the current collector that does not contribute to electrical characteristics may increase. Accordingly, the length along the length direction L of the first end portion 11c is preferably 1000 times or less the thickness of the first current collector 11a, more preferably 700 times or less. The length along the length direction L of the second end portion 12c is greater than the thickness of the second current collector 12a. Specifically, the length along the length direction L of the second end portion 12c is preferably 200 times or more the thickness of the second current collector 12a, more preferably 300 times or more. However, if the length along the length direction L of the second end portion 12c is too long, the area of the current collector that does not contribute to electrical characteristics may increase. Accordingly, the length along the length direction L of the second end portion 12c is preferably 1000 times or less the thickness of the second current collector 12a, more preferably 700 times or less.

Hereinafter, a description will be given of another example of a preferred embodiment of the present invention. In the following description, members having substantially the same functions as those of the first embodiment will be referred to using the same symbols and description thereof will be omitted.

Second Embodiment

Figure 4:
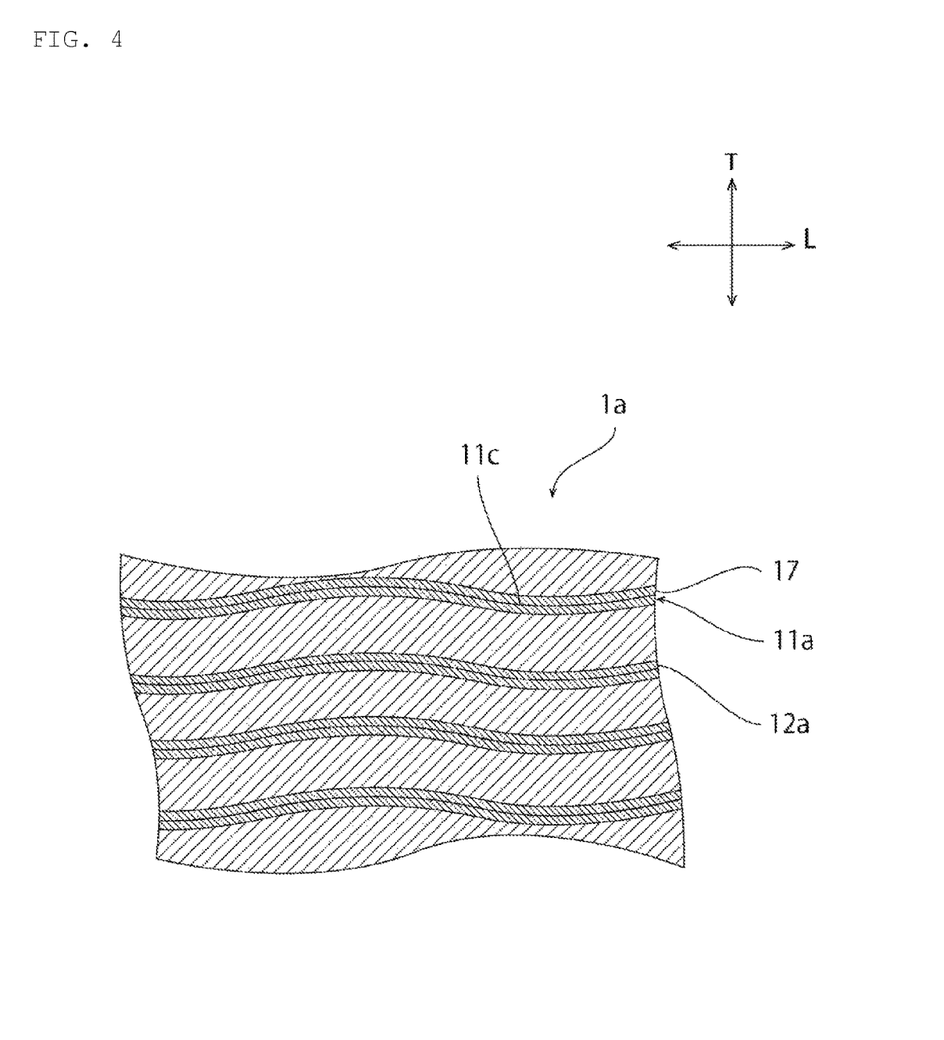
FIG. 4 is a schematic cross-sectional view of a portion of a laminated power storage device according to a second embodiment.

FIG. 4 is a schematic cross-sectional view of a portion of a laminated power storage device 1a according to the second embodiment. In the present embodiment, each of first and second end portions 11c and 12c has a curved portion that curves along the length direction. Thus, it is possible to increase an adhesive area between each of first and second current collectors 11a and 12a and an insulating adhesive portion 15. Thus, it is possible to further increase the adhesion strength between each of the first and second current collectors 11a and 12a and the insulating adhesive portion 15. In addition, a leakage path of an electrolyte can be lengthened. Accordingly, leakage of the electrolyte can be suppressed more effectively.

In the present embodiment, in the laminated power storage device 1a, the first and second end portions 11c and 12c each have a plurality of the curved portions. In this case, as compared with the case where the first and second end portions 11c and 12c do not have a plurality of the curved portions, the adhesive area between each of the first and second current collectors 11a and 12a and the insulating adhesive portion 15 can be further increased. In addition, the leakage path of the electrolyte can be further lengthened. Thus, the leakage of the electrolyte can be suppressed more effectively.

DESCRIPTION OF REFERENCE SYMBOLS 1, 1a: Laminated power storage device
10: Device body
10A: Functional portion
10B: Casing
10a: First principal surface
10b: Second principal surface
10c: Second side surface
10d: Second side surface
10e: First end surface
10f: Second end surface
11: First internal electrode
12: Second internal electrode
11a: First current collector
12a: Second current collector
11b: First polarizable electrode layer
12b: Second polarizable electrode layer
11c: First end portion
12c: Second end portion
11d, 12d: End portion
13: Electrolyte-containing layer
15: Insulating adhesive portion
17: Adhesive layer 18: First external electrode
18a: First electrode film
18b: First metal cap
19: Second external electrode
19a: Second electrode film
19b: Second metal cap

The invention claimed is:

1. A laminated power storage device comprising:
a device body having first and second principal surfaces extending along a length direction and a width direction, first and second side surfaces extending along the length direction and a thickness direction, and first and second end surfaces extending along the width direction and the thickness direction, the device body comprising:
a first internal electrode which has a first current collector and a first polarizable electrode layer on at least one surface of the first current collector and the first current collector extends to the first end surface,
a second internal electrode which has a second current collector and a second polarizable electrode layer on at least one surface of the second current collector and the second current collector extends to the second end surface,
an electrolyte-containing layer between the first polarizable electrode layer and the second polarizable electrode layer, and
an insulating adhesive portion adhered to the first current collector and the second current collector and extending around the first and second polarizable electrode layers and the electrolyte-containing layer,
a first end portion of the first current collector on the second end surface side of the device body extends inside of the insulating adhesive portion relative to the first polarizable electrode layer, and
a second end portion of the second current collector on the first end surface side of the device body extends inside of the insulating adhesive portion relative to the second polarizable electrode layer.

2. The laminated power storage device according to claim 1, wherein respective principal surfaces of the first end portion and the second end portion are adhered to the insulating adhesive portion.

3. The laminated power storage device according to claim 1, wherein third end portion in a width direction of the first current collector extends inside of the insulating adhesive portion relative to the first polarizable electrode layer, and a fourth end portion in a width direction of the second current collector extends inside of the insulating adhesive portion relative to the second polarizable electrode layer.

4. The laminated power storage device according to claim 1, wherein a first length along a length direction of the first end portion is greater than a first thickness of the first current collector, and a second length along a length direction of the second end portion is greater than a second thickness of the second current collector.

5. The laminated power storage device according to claim 4, wherein the first length is 100 times to 1000 times the thickness of the first current collector.

6. The laminated power storage device according to claim 4, wherein the first length is 300 times to 700 times the thickness of the first current collector.

7. The laminated power storage device according to claim 5, wherein the second length is 200 times to 1000 times the thickness of the second current collector.

8. The laminated power storage device according to claim 6, wherein the second length is 300 times to 700 times the thickness of the second current collector.

9. The laminated power storage device according to claim 1, wherein each of the first and second end portions has a curved portion that curves along a length direction of the laminated storage device.

10. The laminated power storage device according to claim 9, wherein each of the first and second end portions has a plurality of the curved portions.

11. The laminated power storage device according to claim 1, wherein the insulating adhesive portion comprises a material which does not allow an electrolyte to permeate therethrough.

12. The laminated power storage device according to claim 11, wherein the material of the insulating adhesive portion is a resin composition containing an acrylic resin and a filler.

13. The laminated power storage device according to claim 1, further comprising:
a first external electrode on the first end surface and electrically connected to the first internal electrode; and
a second external electrode on the second end surface and electrically connected to the second internal electrode.

* * * * *